April 20, 1937. J. C. McCUNE 2,077,949
FLUID PRESSURE BRAKE
Filed June 4, 1935
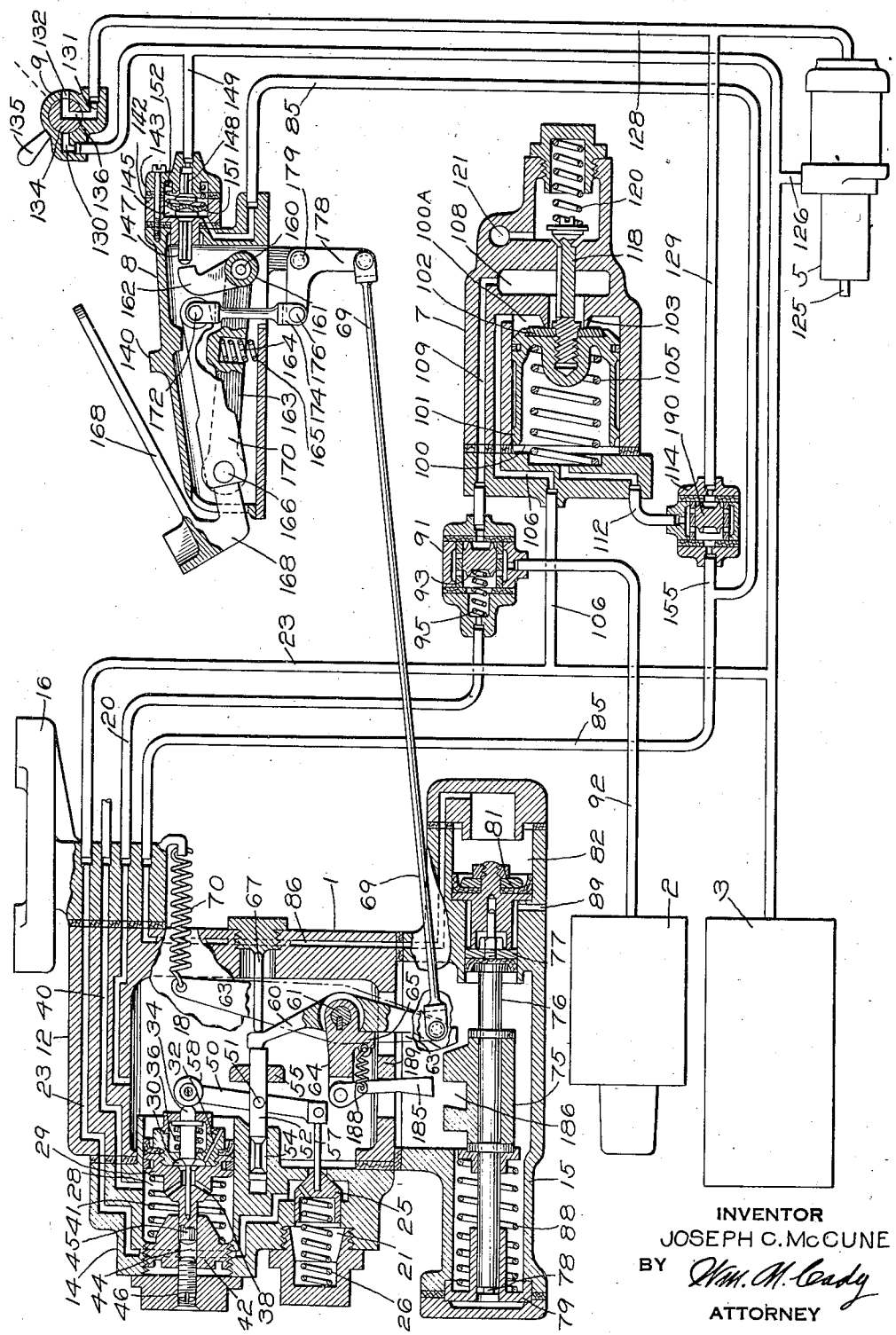
INVENTOR
JOSEPH C. McCUNE
BY *Wm. M. Cady*
ATTORNEY Patented Apr. 20, 1937

2,077,949

UNITED STATES PATENT OFFICE 2,077,949

FLUID PRESSURE BRAKE

Joseph C. McCune, Edgewood, Pa., assignor to The Westinghouse Air Brake Company, Wilmerding, Pa., a corporation of Pennsylvania Application June 4, 1935, Serial No. 24,861

14 Claims. (Cl. 303—19)

This invention relates to control apparatus for controlling fluid pressure brakes adapted for use on railway vehicles.

It is the principal object of this invention to provide a brake system which incorporates means for effecting an emergency application of the brakes when the operator's foot is removed from a pedal, together with means interconnected with the door control for preventing an emergency application of the brakes when the operator's foot is released from the pedal if the doors have been opened, and providing that a service application of the brakes of a predetermined degree has been effected.

A further object of this invention is to provide a braking system having a manually operated brake valve device for controlling the supply and release of fluid to and from the brake cylinder for service applications of the brakes, together with safety control apparatus for supplying fluid under pressure to the brake cylinder independently of the manually operated brake valve device for effecting emergency applications of the brakes, and means interconnected with the door control mechanism for rendering the last named means inoperative when the doors are opened.

Another object of the invention is to provide a brake system having a manually operable brake valve device for controlling the supply and release of fluid under pressure to and from the brake cylinder for effecting service applications of the brakes, together with a pair of pressure responsive means controlled by the pressure of the fluid in the safety control pipe for supplying fluid under pressure to the brake cylinder for effecting emergency applications of the brakes, one of said means being rendered inoperative on a predetermined service application of the brakes, the other of said means being rendered inoperative when the doors are opened.

A further object of the invention is to provide a brake system incorporating means controlled by the opposing pressures of the fluid in the safety control pipe and in a reservoir for supplying fluid under pressure to the brake cylinder on a reduction in the pressure of the fluid in the safety control pipe, whereby fluid is supplied to the brake cylinder very quickly upon a reduction in the pressure of the fluid in the safety control pipe.

Other objects of the invention and features of novelty will be apparent from the following description taken in connection with the accompanying drawing, the single figure of which is a diagrammatic view, largely in section, of a brake system incorporating my invention.

Referring to the drawing it will be seen that this system comprises a brake valve device 1, which is of the self-lapping type, a brake cylinder 2, a reservoir 3, a door engine 5, a fluid pressure operated valve device 7, a manual control device 8, and a door engine control valve 9.

The brake valve device 1, which is of the self-lapping type, comprises a casing having a main section 12, a valve section 14, an emergency section 15, and a pipe bracket section 16 by means of which the brake valve device is secured to the frame of a vehicle. The casing sections 12, 14 and 15, when secured together, define a pressure chamber 18 which communicates with the brake cylinder 2 by way of a passage and pipe 20.

The valve section 14 is provided with a valve chamber 21 which is in constant communication with the reservoir 3 by way of the passage and pipe 23, and which contains a supply valve element 25 which is urged to its seat by a coil spring 26 and which controls communication between the valve chamber 21 and the pressure chamber 18.

The valve section 14 is also provided with a piston chamber 28 in which is mounted a piston 29 which has formed therein a valve chamber 30 which is in constant communication with the pressure chamber 18 by way of a passage 32.

The valve chamber 30 has positioned therein a release valve element 34 which is biased to the unseated position by a coil spring 36, and when the valve element 34 is in its unseated position the valve chamber 30 is in communication with the atmosphere by way of the passages 38, the piston chamber 28 and the passage 40.

The piston 29 is subject on one side to the pressure of the fluid in the pressure chamber 18, and on the other side to the pressure of the coil spring 41 which extends between the piston 29 and an abutment 42.

The abutment 42 is provided with a central bore 44 adapted to receive a reduced extension 45 of the piston 29 while a regulating screw 46 is adapted to extend into the bore 44 to limit the amount of movement of the piston 29 to the left as viewed in the drawing.

For actuating the supply valve element 25 to its unseated position and the release valve element 34 to the seated position there is provided a mechanism including a lever 50, which is secured intermediate its ends by a pin 51 to a floating pivot carrier 52, which is slidably mounted in a bore 54 in the valve casing section 14 and in a guiding lug 55 formed integral with the main casing section 12.

A stem 57 is pivotally secured to the lower end of the lever 50 and extends into a bore in the end of the supply valve element 25, while a roller 58 is pivotally mounted on the other end of the lever 50 and is adapted to engage the rounded end of the release valve element 34.

The springs 26, 36 and 41 are of different values, the spring 26 being of greater resistance than the spring 36 and being of less resistance than the spring 41.

When the floating pivot carrier 52 is moved to the left, as viewed in the drawing, the lever 50 will pivot on the pin 51 and the release valve element 34 will be moved to the left against the pressure of the spring 36 so as to close the passages controlled thereby.

On engagement of the release valve element 34 with its seat, and on further movement of the floating pivot carrier 52 to the left, the lever 50 will pivot on the axis formed by the roller 58 and the supply valve element 25 will be moved to the left to open the passage leading from the reservoir 3 to the brake cylinder 2 through the pressure chamber 18. The spring 41 is of such value, and the lever 50 and the associated members are so proportioned that movement of the floating pivot carrier 52 does not affect the position of the piston 29.

For actuating the floating pivot carrier 52 there is provided a lever 60 which is loosely mounted on a shaft 61 which is journaled in the main casing section 12 and which projects through the casing section wall and has the lever 63 rigidly secured on the outer end thereof. A lever 64 is rigidly secured on the shaft 61 and is provided with a lug or projecting portion 65 which overlies a portion of the lever 60 so that when the lever 64 is moved in a counterclockwise direction, as viewed in the drawing, the lug 65 will engage the lever 60 and cause it to move the floating pivot carrier 52. A suitable stop 67 engages a portion of the lever 60 to limit movement of this lever in the clockwise direction.

The lever 63, which is mounted outside of the main section 12, has the operating member 69 secured to one end thereof, and has secured to the other end thereof a spring 70 which urges the lever to move in a clockwise direction.

The emergency section 15 of the brake valve device 1 is provided with a latch block 75 which is secured to a rod 76 which has mounted on one end thereof a piston 77 and has the other end thereof slidably mounted in a bore 78 in a guiding element 79. For operating the rod 76 and the latch block 75 to the left there is provided a piston 81 disposed in a chamber 82 and adapted to engage the piston 77 which is secured on the rod 76.

Fluid under pressure is supplied to the chamber 82 from the safety control pipe 85 by way of a passage 86, and as long as fluid under pressure is supplied to the chamber 82 at a pressure sufficient to overcome the spring 88 and the pressure of the fluid in the chamber 18 acting on the piston 77, the piston 81 will maintain the latch block 75 and rod 76 in the position to the left as shown in the drawing, but when fluid is released from the chamber 82 the piston 81 is permitted to move to the right, and the spring 88 then moves the latch block 75 to the right so that the upper portion of the latch block 75 engages the lower end of the lever 60 to move it in a counterclockwise direction. The rod 76 is also urged to the right by the pressure of the fluid in the pressure chamber 18 acting on the piston 77, which also serves to prevent the escape of fluid under pressure from the chamber 18.

An atmospheric vent passage 89 opens to the chamber intermediate the pistons 77 and 81 so that this chamber is maintained at atmospheric pressure.

The brake cylinder 2 is connected to a double check valve 91 by means of a pipe 92, and the pipe 20 which communicates with the pressure chamber 18 is connected to the chamber of the double check valve 91 at one side of the valve element 93, which is urged by means of the spring 95 to a position to permit communication between the pipe 20 and the pipe 92.

The fluid pressure operated valve device 7 comprises a casing having a piston bore formed therein in which is mounted a valve piston 101 which is provided with a sealing gasket 102 which is urged into engagement with a seat rib 103 by means of a spring 105 and by the pressure of the fluid in the chamber 100 on the spring side of the valve piston so as to cut off communication between the chamber 100A on the right hand side of the valve piston 101, which is in constant communication with the reservoir 3 by way of a pipe and passage 106, and a chamber 108 which is in constant communication with one side of the double check valve 91 by way of passage 109. The chamber 100 on the spring side of the valve piston 101 communicates by way of the pipe and passage 112 with a double check valve 114.

The valve piston 101 has mounted thereon a valve element 118 which is urged to the seated position by a spring 120 and which controls communication between the chamber 108 and the atmosphere by way of an atmospheric passage 121.

The door engine 5 may be of a well known construction, not shown, but comprising a casing having piston chambers of unequal diameter formed therein in which are mounted pistons which are secured on a stem 125 which projects from the casing and which may be connected to operating mechanism (not shown) for the doors. The chamber between the pistons is constantly connected to the main reservoir 3 by means of a pipe 126, and the pressure of the fluid in this chamber operating on the differential areas of the pistons maintains the stem 125 in the door closed position.

The chamber on the opposite side of the larger piston is connected to the door valve 9 by means of a pipe 128 which has a branch pipe 129 connected thereto and communicating with one side of the double check valve 114. When fluid under pressure is supplied to the pipe 128 the pressure of the fluid acting on the piston in the door engine moves the stem 125 to a position to open the doors.

The door engine control valve 9 comprises a casing having a passage 130 therein which communicates with the main reservoir 3, a passage 131 to which is connected the pipe 128 leading to the door engine 5, and an atmospheric exhaust passage 132. The casing of the door engine control valve has a rotary valve 134 positioned therein and controlled by an operating handle 135. The rotary valve 134 has an angular passage 136 therein which in one position of the operating handle 135 connects the pipe 128 and passage 131 with the atmospheric exhaust passage 132, and in another position of the operating handle 135 connects the supply passage 130 with the passage 131.

The manual control device 8 comprises a plurality of casing sections including a principal section 140 and a pair of valve sections 142 and 143, which when fitted together form a valve chamber 145 in which is positioned a release valve element 147 which controls communication between the valve chamber 145 and the atmosphere, and a supply valve element 148 which controls communication between the valve chamber 145 and a pipe 149, which communicates with the main reservoir 3.

The release valve element 147 is engaged by a washer 151 which forms a seat for a spring 152, which operating through the washer 151 urges the release valve element 147 to the seated position.

The valve chamber 145 is in constant communication with the safety control pipe 85, which pipe has a branch passage 155 which is connected to one side of the double check valve 114.

The casing section 140 has pivotally mounted therein on a pin 160 a forked lever 161 which has a hub portion through which the pin extends, and a valve operating finger 162 and a pair of arms 163. Each of the arms 163 has a recess 164 formed therein, into which extends a coil spring 165 and which normally urges the left hand end of the arm upwardly. The ends of the arms 163 have pivotally mounted thereon on a pin 166 a foot pedal 168 which has an arm 170 formed integral therewith and extending between the forked arms 163.

The end of the arm 170 has pivotally connected thereto by means of a pin 172 a link 174 which has its other end pivotally connected by means of a pin 176 to one arm of a bell crank 178 which is mounted on an extension of the casing section 140 by means of a pin 179, while the other arm of the bell crank 178 has the operating rod 69 secured thereto.

In operation, assuming that the reservoir 3 is charged with fluid under pressure and that there has been an application of the brakes as a result of venting of fluid under pressure from the safety control pipe, the operator places his foot upon the foot pedal 168 and presses downwardly on the heel portion of this foot pedal so that the forked lever 161 is rotated in a counterclockwise direction about the pin 160 against the spring 165 and the valve operating finger 162 is moved out of engagement with the end of the release valve element 147 which is thereupon permitted to seat, while the supply valve element 148 is moved away from its seat by the pressure of the fluid in the pipe 149. Fluid thereupon flows from the reservoir 3 to the valve chamber 145, and therefrom to the safety control pipe 85 which communicates by way of the pipe 155 and the double check valve 114 with the pipe and passage 112 which leads to the chamber 100 in the fluid pressure operated valve device 7. The pressure of the fluid in this chamber together with the spring 105 forces the valve piston 101 into engagement with the seat rib 103.

Fluid in the safety control pipe 85 also flows to the passage 86 in the brake valve device 1, and therefrom to the chamber 82 where the fluid acting on the piston 81 forces this piston to the left as viewed in the drawing, thus moving the rod 76 and the latch block 75 to the left so that the latch block 75 is out of engagement with the lower end of the lever 60. This permits the shaft 61 to be rotated in a clockwise direction to the release position by means of the spring 70, if this shaft is not already in this position.

If the operator desires to effect a service application of the brakes he maintains pressure on the heel portion of the foot pedal 168 and presses downwardly on the toe portion of this pedal causing the pedal to rotate about the pin 166, thus causing downward movement of the link 174, the movement of which is transmitted to the bell crank 178 and therethrough to the rod 69, which acting through the lever 63, the shaft 61, and the lug 65 on the lever 64 causes the lever 60 to be rotated in a counterclockwise direction.

Movement of the lever 60 in a counterclockwise direction causes the floating pivot carrier 52 to be moved to the left, as viewed in the drawing, and movement of this carrier first causes the release valve element 34 to be moved to the seated position to cut off communication between the pressure chamber 18 and the atmosphere, and further movement of the floating pivot carrier causes the supply valve element 25 to be moved away from its seat and thus permit fluid under pressure to flow from the main reservoir 3 by way of the pipe and passage 23 to the pressure chamber 18, from which the fluid flows by way of the passage and pipe 20 to the double check valve 91, and therefrom by way of the pipe 92 to the brake cylinder 2 to effect an application of the brakes.

When the pressure in the pressure chamber 18 increases to a sufficient value, dependent upon the distance which the floating pivot carrier has been moved, the pressure of the fluid acting on the piston 29 moves this piston to the left, as viewed in the drawing, against the pressure of the spring 41, and on movement of this piston, the spring 26 forces the supply valve element 25 to the seated position to cut off the further flow of fluid to the pressure chamber 18, and consequently to the brake cylinder, so that the brake cylinder pressure obtained corresponds with that in the pressure chamber.

If the operator desires to increase the degree of application of the brakes he presses down somewhat farther on the toe portion of the foot pedal 168 so as to effect a greater amount of rotation of the lever 60 to move the floating pivot carrier 52 to the left a greater distance. This causes the supply valve element to again be unseated, and it will remain unseated until the pressure in the pressure chamber 18 increases sufficiently to move the piston 29 against the spring 41 a distance sufficient to again permit the supply valve element 25 to be moved to the seated position.

If the operator desires to release the brakes he may do so by maintaining pressure on the heel portion of the foot pedal 168, while releasing pressure from the toe portion of the foot pedal, thus permitting the pedal to rotate in a counterclockwise direction about the pin 166. This movement on the foot pedal is transmitted by means of the link 174 and the bell crank 178 to the operating rod 69 which permits the lever 60 to move in a clockwise direction. On movement of the lever 60 in a clockwise direction, the floating pivot carrier 52 is permitted to move to the right as viewed in the drawing and on this movement of the carrier, the release valve element 34 will be moved to the unseated position by means of the spring 36 and fluid will be released from the pressure chamber 18 to the atmosphere by way of the passage 32, the valve chamber 30, the passages 38, the piston chamber 28 and the release passage 40. When fluid is released from the pressure chamber 18 it is also released from the brake cylinder 2 as the brake cylinder is in communication with the pressure chamber 18 by way of the pipe 92, the double check valve 91, the valve element 93 of which is maintained by the spring 95 in a position to permit communication between the pipe 92 and the pipe 20 which communicates with the pressure chamber 18.

If at any time the operator should remove his foot from the heel portion of the foot pedal 168, either intentionally or otherwise, the arms 163 of the lever 161 will be forced upwardly by the springs 165, and the operating finger 162 will be forced against the end of the valve 147 and will move this valve away from its seat so as to permit fluid from the safety control pipe 85 to escape to the atmosphere, and at the same time the valve 148 will be moved to the seated position to cut off the further supply of fluid under pressure from the reservoir to the safety control pipe.

Upon the release of fluid under pressure from the safety control pipe 85 fluid will also be released from the chamber 100 on the spring side of the valve piston 101, and on a reduction in the pressure of the fluid on this side of the valve piston, the valve piston will be moved away from the seat rib 103 by the pressure of the fluid in the chamber 100A acting on the face of the valve piston outwardly of the seat rib 103. When the valve piston 101 moves away from the seat rib 103, fluid thereupon flows from the main reservoir 3 by way of the passage 106 to the chamber 108, and therefrom by way of the passage 109 to the double check valve 91, where it forces the valve element 93 to the left against the spring 95 to cut off communication between the brake cylinder and the pressure chamber 18 in the brake valve device 1, and to permit fluid to flow from the passage 109 to the pipe 92 and therefrom to the brake cylinder 2 to effect an application of the brakes.

When the valve piston 101 moves away from the seat rib 103 the valve 118 moves to the seated position to cut off the flow of fluid from the chamber 108 to the atmosphere by way of the passage 121.

The area of the face of the valve piston 101 outwardly of the seat rib 103 is a relatively large proportion of the total area of the face of the valve piston 101 and the pressure of the fluid from the reservoir in the chamber 100A acting on the face of the valve piston outwardly of the seat rib 103 will be sufficient to overcome the pressure of the fluid supplied to the chamber 100 from the safety control pipe and of the spring 105, and move the valve piston away from the seat rib 103 when the safety control pipe pressure is reduced only a small amount below the reservoir pressure. The fluid pressure operated device 7 therefore operates very quickly on a reduction in the pressure in the safety control pipe to supply fluid to the brake cylinder to effect an emergency application of the brakes.

At the same time, when fluid is released from the safety control pipe, the pressure of the fluid in the chamber 82 in the brake valve device 1 will be reduced and the spring 88 will force the latch block 75 and the rod 76 to the right, as viewed in the drawing, and the latch block 75 will engage the lower end of the lever 60 to cause this lever to be rotated in a counterclockwise direction to move the release valve 34 to the seated position and to unseat the supply valve 25 so that the brake valve device 1 is conditioned to supply fluid under pressure to the brake cylinder.

This system, therefore, provides means to effect an emergency application of the brakes as a result of release of pressure from the foot pedal 168.

In order that pressure may be released from the foot pedal 168 of the foot valve device 8 when an application of the brakes has been effected there is provided as a part of the brake valve device 1, a latch 185 which is pivotally secured to the lever 64 and which has an end portion adapted to extend into a notch 186 in the latch block 75. The latch 185 is normally urged to the right, as viewed in the drawing, by a spring 188, and when the lever 64 is rotated in a counterclockwise direction, the end of the latch 185 projects into the recess 186 to prevent movement of the latch block 75 by the spring 88 so that when there has been an application of the brakes by the manual movement of the lever 64, the latch block 75 cannot be moved to the right, as viewed in the drawing, to engage the end of the lever 60 and produce an emergency application of the brakes.

At the same time the latch 185 will be securely held by the spring 88 acting through the latch block 75 and forcing the latch against a portion 189 of the main casing section 12. This will prevent movement of the lever 64, to which the latch is secured, to effect a release of the brakes until the pressure of the fluid in the safety control pipe and in the chamber 82 is reestablished. The emergency section operates, therefore, upon a service application of the brakes of a predetermined degree, and upon a release of the fluid in the safety control pipe to prevent an emergency application of the brakes by operation of the brake valve device, and to prevent the release of the brakes until the fluid pressure is restablished in the safety control pipe.

This system also includes means to prevent an emergency application of the brakes by operation of the fluid pressure operated device 7 at a time when the doors are open. When fluid is supplied to the door engine 5 by operation of the control valve 9 fluid is also supplied to the pipe 129 which communicates with one side of the double check valve 114. If the operator now releases pressure on the foot pedal 168 so as to vent fluid from the safety control pipe, the pressure of the fluid in the pipe 129 will cause the valve 190 to be moved to the left, as viewed in the drawing, to cut off communication from the pipe 155, and to permit fluid to flow from pipe 129 to the pipe and passage 112, and therefrom to the chamber 100 on the spring side of the valve piston 101, and the pressure of the fluid in this chamber maintains the valve piston in the seated position.

Upon a service application of the brakes or after an emergency application of the brakes followed by the opening of the doors, the double check valve 91 perates to prevent the release of fluid from the brake cylinder by way of the fluid pressure operated device 7 as the valve 93 is maintained by the spring 95, and by the pressure of the fluid in the chamber on the left hand side of the valve, in a position to cut off communication between the pipe 92 and the passage 109 in the fluid pressure operated device 7.

It will be seen, therefore, that the brake valve device 1 has means associated therewith to prevent an emergency application of the brakes by the emergency section 15 in the event that a service application of the brakes of a predetermined degree has been effected, while the system also has the means to prevent an emergency application of the brakes by the fluid pressure operated device 7 when the doors are opened.

This makes it possible for the operator to apply the brakes to a predetermined degree to hold the car, and to open the doors, and then remove his foot from the foot pedal 168 without producing an emergency application of the brakes. However, in the event that the pressure is released from the foot pedal 168 at a time when a predetermined service application of the brakes has not been secured, or at a time when the doors are not open, an emergency application of the brakes will be automatically effected.

While one embodiment of the brake system provided by this invention has been illustrated in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake, the combination with a brake valve device operable to effect an application of the brakes, manually operated means for operating said brake valve device, a safety control pipe, fluid pressure responsive means operated by a variation in the pressure in said safety control pipe for also operating said valve device to effect an application of the brakes, other fluid pressure responsive means operated by a variation in the pressure in said safety control pipe for supplying fluid under pressure to the brake cylinder independently of the brake valve device.

2. In a fluid pressure brake, the combination with a brake valve device operable to effect an application of the brakes, manually operated means for operating said brake valve device, a safety control pipe, fluid pressure responsive means operated by a variation in the pressure in said safety control pipe for also operating said valve device to effect an application of the brakes, other fluid pressure responsive means operated by a variation in the pressure in said safety control pipe for supplying fluid under pressure to the brake cylinder independently of the brake valve device, and means operable by manual operation of the brake valve device to effect a predetermined application of the brakes for rendering ineffective the fluid pressure responsive means for operating said brake valve device.

3. In a fluid pressure brake, the combination with a brake valve device operable to effect an application of the brakes, manually operated means for operating said brake valve device, a safety control pipe, fluid pressure responsive means operated by a variation in the pressure in said safety control pipe for also operating said valve device to effect an application of the brakes, other fluid pressure responsive means operated by a variation in the pressure in said safety control pipe for supplying fluid under pressure to the brake cylinder independently of the brake valve device, a fluid pressure operated door engine, and means responsive to the supply of fluid under pressure to said door engine to open the door for rendering said last named means inoperative.

4. In a fluid pressure brake, the combination with a brake valve device operable to effect an application of the brakes, manually operated means for operating said brake valve device, a safety control pipe, fluid pressure responsive means operated by a variation in the pressure in said safety control pipe for also operating said brake valve device to effect an application of the brakes, means operable by manual operation of the brake valve device to effect a predetermined application of the brakes for rendering ineffective the fluid pressure responsive means for operating said brake valve device, other fluid pressure responsive means operated by a variation in the pressure in said safety control pipe for supplying fluid under pressure to the brake cylinder independently of the brake valve device, a fluid pressure operated door engine, and means responsive to the supply of fluid under pressure to said door engine to open the doors for rendering the last named means inoperative.

5. In a fluid pressure brake, in combination, a brake cylinder, a reservoir, a safety control pipe, a brake valve device operable to effect an application of the brakes, manually operated means for operating said brake valve device, a fluid pressure responsive means operated by a variation in the pressure in said safety control pipe for also operating said valve device to effect an application of the brakes, and means subject to the opposing pressures of the fluid in the safety control pipe and the pressure of the fluid in the reservoir and operated upon a reduction in the pressure in the safety control pipe for also supplying fluid under pressure to the brake cylinder.

6. In a fluid pressure brake, in combination, a brake cylinder, a reservoir, a safety control pipe, a brake valve device operable to effect an application of the brakes, manually operated means for operating said brake valve device, fluid pressure responsive means operated by a variation in the pressure in said safety control pipe for also operating said valve device to effect an application of the brakes, means subject to the opposing pressures of the fluid in the safety control pipe and the pressure of the fluid in the reservoir and operated upon a reduction in the pressure in the safety control pipe for also supplying fluid under pressure to the brake cylinder to effect an application of the brakes, a fluid pressure operated door engine, and means responsive to the supply of fluid to the door engine to open the doors for rendering said last named means inoperative.

7. In a fluid pressure brake, in combination, a brake cylinder, a safety control pipe, a door engine, a brake valve device operable to effect an application of the brakes, manually operated means for operating said brake valve device, fluid pressure responsive means operated by a variation in the pressure in said safety control pipe for also operating said valve device to effect an application of the brakes, other fluid pressure responsive means operated by a variation in the pressure in said safety control pipe for effecting an application of the brakes independently of the brake valve device, manually operable means for controlling the door engine, and means operable on movement of said manually operable means to a position to effect opening of the doors to render inoperative the fluid pressure responsive means for effecting an application of the brakes independently of the brake valve device.

8. In a fluid pressure brake, the combination with a brake valve device operable to effect an application of the brakes, manually operated means for operating said brake valve device, a safety control pipe, fluid pressure responsive means operated by a variation in the pressure in said safety control pipe for also operating said valve device to effect an application of the brakes, other fluid pressure responsive means operated by a variation in the pressure in said safety control pipe for supplying fluid under pressure to the brake cylinder independently of the brake valve device, and means to prevent the release of fluid under pressure through the passage through which fluid is supplied to the brake cylinder independently of the brake valve device.

9. In a fluid pressure brake, in combination, a brake cylinder, a brake valve device operable to effect an application of the brakes, a safety control pipe, a door engine, manually operated means for effecting operation of the door engine, fluid pressure operated means for supplying fluid under pressure to the brake cylinder to effect an application of the brakes independently of the brake valve device, means for supplying fluid under pressure to said fluid pressure operated means from the safety control pipe, and means for supplying fluid under pressure to said fluid pressure operated means by operation of the manually operated means for effecting operation of the door engine to open the door.

10. In a fluid pressure brake, in combination, a brake cylinder, a brake valve device operable to effect an application of the brakes, a safety control pipe, a door engine, manually operated means for effecting operation of the door engine, fluid pressure operated means for supplying fluid under pressure to the brake cylinder to effect an application of the brakes independently of the brake valve device, means for supplying fluid under pressure to said fluid pressure operated means from the safety control pipe, means for supplying fluid under pressure to said fluid pressure operated means by operation of the manually operated means for effecting operation of the door engine to open the door, and means to control communication between the safety control pipe and the passage through which fluid is supplied to the fluid pressure operated means on operation of the means for effecting operation of the door engine.

11. In a fluid pressure brake, in combination, a brake cylinder, a safety control pipe normally charged with fluid under pressure, a valve device subject to the pressure of fluid in said pipe and operated upon a reduction in pressure in said safety control pipe for supplying fluid under pressure to the brake cylinder, a car door operating means operated by fluid under pressure for opening a car door, and valve means subject to the opposing pressures of fluid supplied to open the car door and of the fluid in the safety control pipe and operated upon a reduction in safety control pipe pressure for cutting off communication from said pipe to said valve device.

12. In a fluid pressure brake, in combination, a brake cylinder, a safety control pipe normally charged with fluid under pressure, a valve device subject to the pressure of fluid in said pipe and operated upon a reduction in pressure in said safety control pipe for supplying fluid under pressure to the brake cylinder, a car door operating means operated by fluid under pressure for opening a car door, and valve means subject to the opposing pressures of fluid supplied to open the car door and of the fluid in the safety control pipe and operated upon a reduction in safety control pipe pressure for cutting off communication from said pipe to said valve device and for supplying fluid for effecting the opening of the car door to said valve device.

13. In a fluid pressure brake, in combination, a brake cylinder, a reservoir, valve means subject to the opposing pressures of the fluid in the reservoir and in a chamber and operated on a reduction in the pressure of the fluid in said chamber to supply fluid under pressure to the brake cylinder, a safety control pipe, means for supplying fluid under pressure to said chamber from the safety control pipe and for releasing fluid from said chamber through said safety control pipe, a door engine operated on the supply of fluid under pressure thereto to open the doors, and means subject to the pressure of the fluid supplied to said door engine for cutting off communication between said chamber and the safety control pipe and for supplying fluid under pressure to said chamber.

14. In a fluid pressure brake, in combination, a brake cylinder, a reservoir, valve means subject to the opposing pressures of the fluid in the reservoir and in a chamber and operated on a reduction in the pressure of the fluid in said chamber to supply fluid under pressure to the brake cylinder, a safety control pipe, means for supplying fluid under pressure to said chamber from the safety control pipe and for releasing fluid from said chamber through said safety control pipe, a door engine operated on the supply of fluid under pressure thereto to open the doors, and means subject to the opposing pressures of the fluid supplied to the door engine and of the fluid in the safety control pipe for cutting off the release of fluid under pressure from said chamber through the safety control pipe.

JOSEPH C. McCUNE.